(12) United States Patent
Newhouse et al.

(10) Patent No.: US 10,462,383 B2
(45) Date of Patent: Oct. 29, 2019

(54) SYSTEM AND METHOD FOR ACQUIRING VIRTUAL AND AUGMENTED REALITY SCENES BY A USER

(71) Applicant: DROPBOX, INC., San Francisco, CA (US)

(72) Inventors: Benjamin Zeis Newhouse, San Francisco, CA (US); Terrence Edward McArdle, San Francisco, CA (US); Amir Akbarzadeh, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/640,858

(22) Filed: Jul. 3, 2017

(65) Prior Publication Data

US 2017/0366758 A1    Dec. 21, 2017

Related U.S. Application Data

(63) Continuation of application No. 14/668,915, filed on Mar. 25, 2015, now Pat. No. 9,723,226, which is a
(Continued)

(51) Int. Cl.
*G06F 3/01* (2006.01)
*H04N 5/265* (2006.01)
(Continued)

(52) U.S. Cl.
CPC ............ *H04N 5/265* (2013.01); *G06F 3/011* (2013.01); *G06T 19/006* (2013.01); *H04N 5/44* (2013.01);
(Continued)

(58) Field of Classification Search
USPC .......................................................... 463/31
See application file for complete search history.

(56) References Cited

U.S. PATENT DOCUMENTS 5,287,437 A    2/1994   Deering
5,745,126 A    4/1998   Jain et al.
(Continued)

FOREIGN PATENT DOCUMENTS

WO    WO2008/107553    9/2008

OTHER PUBLICATIONS

Ducket, Jon, "Beginning HTML, XHTML, CSS, and JavaScript®," Dec. 30, 2009, Wrox, p. 234.
(Continued)

*Primary Examiner* — Pierre E Elisca
(74) *Attorney, Agent, or Firm* — Keller Jolley Preece

(57) ABSTRACT

A preferred method of acquiring virtual or augmented reality (VAR) scenes can include at a plurality of locations of interest, providing one or more users with a predetermined pattern for image acquisition with an image capture device and for each of the one or more users, in response to a user input, acquiring at least one image at the location of interest. The method of the preferred embodiment can also include for each of the one or more users, in response to the acquisition of at least one image, providing the user with feedback to ensure a complete acquisition of the virtual or augmented reality scene; and receiving at a remote database, from each of the one or more users, one or more VAR scenes. One variation of the method of the preferred embodiment can include providing game mechanics to promote proper image acquisition and promote competition between users.

20 Claims, 5 Drawing Sheets

Related U.S. Application Data continuation of application No. 13/302,977, filed on Nov. 22, 2011, now Pat. No. 9,017,163.

(60) Provisional application No. 61/448,133, filed on Mar. 1, 2011, provisional application No. 61/417,199, filed on Nov. 24, 2010.

(51) Int. Cl.

| | |
|---|---|
| *G06T 19/00* | (2011.01) |
| *H04N 5/44* | (2011.01) |
| *H04N 21/231* | (2011.01) |
| *H04N 21/24* | (2011.01) |
| *H04N 21/2665* | (2011.01) |
| *H04N 21/414* | (2011.01) |
| *H04N 21/422* | (2011.01) |
| *H04N 21/4223* | (2011.01) |
| *H04N 21/478* | (2011.01) |
| *H04N 21/6547* | (2011.01) |
| *H04N 21/658* | (2011.01) |
| *H04N 21/6587* | (2011.01) |

(52) U.S. Cl.
CPC ... *H04N 21/23109* (2013.01); *H04N 21/2408* (2013.01); *H04N 21/2665* (2013.01); *H04N 21/41407* (2013.01); *H04N 21/4223* (2013.01); *H04N 21/42202* (2013.01); *H04N 21/4781* (2013.01); *H04N 21/6547* (2013.01); *H04N 21/6582* (2013.01); *H04N 21/6587* (2013.01)

(56) References Cited

U.S. PATENT DOCUMENTS

| | | | |
|---|---|---|---|
| 5,841,439 | A | 11/1998 | Ronald et al. |
| 5,990,941 | A | 11/1999 | Jackson et al. |
| 6,226,669 | B1 | 5/2001 | Huang et al. |
| 6,389,179 | B1 | 5/2002 | Katayama et al. |
| 6,760,026 | B2 | 7/2004 | Li et al. |
| 7,133,068 | B2 | 11/2006 | Fisher et al. |
| 7,136,090 | B1 | 11/2006 | White |
| 7,224,326 | B2 | 5/2007 | Sefton |
| 7,389,591 | B2 | 6/2008 | Jaiswal et al. |
| 7,424,218 | B2 | 9/2008 | Baudisch et al. |
| 7,499,586 | B2 | 3/2009 | Agarwala et al. |
| 7,564,469 | B2 | 7/2009 | Cohen |
| 7,688,346 | B2 | 3/2010 | Richards |
| 8,041,574 | B2 | 10/2011 | Yano |
| 8,144,232 | B2 | 3/2012 | Larson et al. |
| 8,154,634 | B2 | 4/2012 | Fukumoto |
| 8,301,159 | B2 | 10/2012 | Hamynen et al. |
| 8,373,573 | B2 | 2/2013 | Chou et al. |
| 8,384,718 | B2 | 2/2013 | Dahlke |
| 8,698,902 | B2 | 4/2014 | Kawamoto et al. |
| 8,730,156 | B2 | 5/2014 | Weising et al. |
| 8,907,983 | B2 | 12/2014 | McArdle et al. |
| 8,953,022 | B2 | 2/2015 | McArdle et al. |
| 9,017,163 | B2 | 4/2015 | Newhouse et al. |
| 9,041,743 | B2 | 5/2015 | McArdle et al. |
| 9,070,219 | B2 | 6/2015 | McArdle et al. |
| 9,118,970 | B2 | 8/2015 | Newhouse et al. |
| 9,223,408 | B2 | 12/2015 | McArdle et al. |
| 9,271,025 | B2 | 2/2016 | McArdle et al. |
| 9,418,479 | B1 | 8/2016 | Worley, III et al. |
| 9,626,799 | B2 | 4/2017 | McArdle et al. |
| 9,723,226 | B2 | 8/2017 | Newhouse et al. |
| 2001/0030693 | A1 | 10/2001 | Fisher et al. |
| 2002/0140666 | A1 | 10/2002 | Bradski |
| 2002/0158873 | A1 | 10/2002 | Williamson |
| 2003/0065668 | A1 | 4/2003 | Sowizral et al. |
| 2003/0174136 | A1 | 9/2003 | Emberling et al. |
| 2004/0027330 | A1 | 2/2004 | Bradski |
| 2005/0219239 | A1 | 10/2005 | Mashitani et al. |
| 2005/0232507 | A1 | 10/2005 | Zimmer |
| 2005/0286125 | A1 | 12/2005 | Sundstrom et al. |
| 2006/0050140 | A1 | 3/2006 | Shin et al. |
| 2006/0082692 | A1 | 4/2006 | Kamijima et al. |
| 2006/0232665 | A1* | 10/2006 | Schowengerdt ... G02B 27/0093 348/51 |
| 2006/0239525 | A1 | 10/2006 | Katayama et al. |
| 2007/0025723 | A1 | 2/2007 | Baudisch et al. |
| 2007/0035562 | A1 | 2/2007 | Azuma et al. |
| 2007/0076016 | A1 | 4/2007 | Agarwala et al. |
| 2007/0103543 | A1 | 5/2007 | Anderson et al. |
| 2007/0168418 | A1 | 7/2007 | Ratnakar |
| 2007/0236493 | A1 | 10/2007 | Horiuchi et al. |
| 2008/0042973 | A1 | 2/2008 | Zhao et al. |
| 2008/0071559 | A1 | 3/2008 | Arrasvuori |
| 2008/0082692 | A1 | 4/2008 | Yano |
| 2008/0094417 | A1 | 4/2008 | Cohen |
| 2008/0194323 | A1 | 8/2008 | Merkli et al. |
| 2008/0266326 | A1 | 10/2008 | Porwal |
| 2008/0280676 | A1 | 11/2008 | Distanik et al. |
| 2008/0292131 | A1 | 11/2008 | Takemoto et al. |
| 2008/0309508 | A1 | 12/2008 | Harmon |
| 2008/0320422 | A1 | 12/2008 | Cazeaux |
| 2009/0140887 | A1 | 6/2009 | Breed et al. |
| 2009/0237564 | A1 | 9/2009 | Kikinis et al. |
| 2009/0240431 | A1 | 9/2009 | Chau et al. |
| 2009/0244097 | A1 | 10/2009 | Estevez |
| 2009/0292774 | A1 | 11/2009 | Box et al. |
| 2010/0001980 | A1 | 1/2010 | Kim et al. |
| 2010/0002122 | A1* | 1/2010 | Larson ............... H04N 5/23293 348/333.01 |
| 2010/0007657 | A1 | 1/2010 | Rurin |
| 2010/0066763 | A1 | 3/2010 | Macdougall et al. |
| 2010/0092079 | A1 | 4/2010 | Aller |
| 2010/0125816 | A1 | 5/2010 | Bezos |
| 2010/0161658 | A1 | 6/2010 | Hamynen et al. |
| 2010/0169837 | A1 | 7/2010 | Hyndman |
| 2010/0171758 | A1 | 7/2010 | Maassel et al. |
| 2010/0188397 | A1 | 7/2010 | Tsai et al. |
| 2010/0208033 | A1 | 8/2010 | Edge et al. |
| 2010/0214111 | A1 | 8/2010 | Schuler et al. |
| 2010/0228633 | A1 | 9/2010 | Stella et al. |
| 2010/0287485 | A1 | 11/2010 | Bertolami et al. |
| 2011/0041060 | A1 | 2/2011 | Chien et al. |
| 2011/0069229 | A1 | 3/2011 | Lord |
| 2011/0090252 | A1* | 4/2011 | Yoon ..................... G06T 19/006 345/633 |
| 2011/0164116 | A1 | 7/2011 | Gay et al. |
| 2011/0201362 | A1 | 8/2011 | Bregman-Amitai et al. |
| 2011/0213861 | A1 | 9/2011 | Fanelli et al. |
| 2011/0216060 | A1 | 9/2011 | Weising |
| 2011/0234631 | A1 | 9/2011 | Kim et al. |
| 2011/0242134 | A1 | 10/2011 | Miller et al. |
| 2011/0248987 | A1 | 10/2011 | Mitchell |
| 2011/0273451 | A1* | 11/2011 | Salemann ............... G06T 15/20 345/427 |
| 2012/0026166 | A1 | 2/2012 | Takeda et al. |
| 2012/0105440 | A1 | 5/2012 | Lieberman et al. |
| 2012/0105483 | A1 | 5/2012 | Fedorovskaya et al. |
| 2012/0113264 | A1 | 5/2012 | Moshrefi et al. |
| 2012/0194553 | A1 | 8/2012 | Osterhout et al. |
| 2012/0212405 | A1 | 8/2012 | Newhouse et al. |
| 2012/0214590 | A1 | 8/2012 | Newhouse et al. |
| 2012/0246223 | A1 | 9/2012 | Newhouse et al. |
| 2013/0038609 | A1 | 2/2013 | Tsai et al. |
| 2014/0019166 | A1 | 1/2014 | Swanson et al. |
| 2014/0267418 | A1 | 9/2014 | McArdle et al. |
| 2015/0070347 | A1 | 3/2015 | Hofmann et al. |
| 2015/0243085 | A1 | 8/2015 | Newhouse et al. |
| 2015/0356788 | A1 | 12/2015 | Abe et al. |
| 2016/0262608 | A1* | 9/2016 | Krueger ............... A61B 3/0041 |
| 2017/0010469 | A1* | 1/2017 | Samec .................. A61B 3/085 |
| 2017/0193709 | A1 | 7/2017 | McArdle et al. |

OTHER PUBLICATIONS

Easypano Holdings Inc, "Panoweaver 6.00 User Manual", Copyright Easypano Holdings Inc., date unknown, downloaded from http://web.archive.org/web/20090711113513/http://www.easypano.

(56) References Cited

OTHER PUBLICATIONS com/download/doc/pw600_manual.pdf with an archive.org verified date of Jul. 11, 2009, pp. 24-74.
Fauster, Loris, and T.U. Wien. "Stereoscopic techniques in computer graphics." TU Wien (2007), 10 pages.
Hewlett Packard, "HP Photosmart R717 Digistal Camera with HP Instant Share User's Manual", Copyright 2005 Hewlett-Packard Development Company, L.P., downloaded from http://h10032.www1.hp.com/ctg/Manual/c00298985.pdf on May 3, 2013, pp. 50-54.
Hildenbrand, Jerry; "Yelp 2.0 brings monocle and checkins to it Android Client,"; located at http:/www.androidcentral.com/yelp-20-brings-monocle-andcheckins-its-android-client; Jul. 5, 2010; 10 pages.
Hwang et al. "Hand-held virtual reality: a feasibility study." Proceedings of the ACM symposium on Virtual reality software and technology. ACM, 2006.
Kanbara, Masayuki, et al. "A stereoscopic video see-through augmented reality system based on real-time vision-based registration." Virtual Reality, 2000. Proceedings. IEEE. IEEE, 2000, 8 pages.
"Motion Control Simulation Applet" http://ir.exp.sis.pitt.edu/res2/data/is/group5/. Archived on Sep. 1, 2006. Retrieved on Nov. 5, 2013 from <http://web.archive.org/web/20060901110520/http://ir.exp.sis.pitt.edu/res2/data/is/group5/>.
Parr62, Ben; "Easter Egg: Yelp Is the iPhone's First Augmented Reality App,"; located at https://web.archive.org/web/20090829094113/http://mashable.com/2009/08/2007/yelp-aug . . . ; August 27, 2009; 10 pages.
"Rotations and Euler angles" http://www.easyspin.org/documentation/eulerangles.html. Archived on Apr. 6, 2008. Retrieved on Nov. 5, 2013 from <https://web.archive.org/web/20080406234538/http://www.easyspin.org/documentation/eulerangles.html>.
U.S. Appl. No. 13/269,231, Nov. 8, 2013, Office Action.
U.S. Appl. No. 13/269,231, Aug. 1, 2014, Notice of Allowance.
U.S. Appl. No. 14/533,000, Mar. 5, 2015, Office Action.
U.S. Appl. No. 14/533,000, Jun. 11, 2015, Office Action.
U.S. Appl. No. 14/533,000, Aug. 12, 2015, Notice of Allowance.
U.S. Appl. No. 13/302,964, Jun. 10, 2013, Office Action.
U.S. Appl. No. 13/302,964, Feb. 11, 2014, Office Action.
U.S. Appl. No. 13/302,964, Aug. 14, 2014, Office Action.
U.S. Appl. No. 13/302,964, Feb. 6, 2015, Office Action.
U.S. Appl. No. 13/302,964, Mar. 30, 2015, Notice of Allowance.
U.S. Appl. No. 13/302,977, May 15, 2013, Office Action.
U.S. Appl. No. 13/302,977, Aug. 14, 2014, Office Action.
U.S. Appl. No. 13/302,977, Jan. 13, 2015, Notice of Allowance.
U.S. Appl. No. 14/668,915, Sep. 29, 2016, Office Action.
U.S. Appl. No. 14/668,915, Mar. 21, 2017, Notice of Allowance.
U.S. Appl. No. 13/347,273, Apr. 23, 2014, Office Action.
U.S. Appl. No. 13/347,273, Oct. 20, 2014, Notice of Allowance.
U.S. Appl. No. 14/582,017, Jun. 19, 2015, Office Action.
U.S. Appl. No. 14/582,017, Oct. 14, 2015, Notice of Allowance.
U.S. Appl. No. 14/582,017, Nov. 6, 2015, Notice of Allowance.
U.S. Appl. No. 13/411,347, Feb. 10, 2014, Office Action.
U.S. Appl. No. 13/411,347, Oct. 21, 2014, Office Action.
U.S. Appl. No. 13/411,347, May 19, 2015, Notice of Allowance.
U.S. Appl. No. 13/410,176, Jun. 21, 2013, Office Action.
U.S. Appl. No. 13/410,176, Mar. 20, 2014, Office Action.
U.S. Appl. No. 13/410,176, Aug. 22, 2014, Office Action.
U.S. Appl. No. 13/410,176, Mar. 3, 2015, Notice of Allowance.
U.S. Appl. No. 14/044,287, Aug. 19, 2015, Office Action.
U.S. Appl. No. 14/044,287, Feb. 5, 2016, Office Action.
U.S. Appl. No. 14/044,287, Jun. 30, 2016, Office Action.
U.S. Appl. No. 14/044,287, Dec. 6, 2016, Notice of Allowance.
U.S. Appl. No. 14/211,786, Oct. 23, 2015, Office Action.
U.S. Appl. No. 14/211,786, Jun. 1, 2016, Office Action.
U.S. Appl. No. 14/211,786, Jan. 5, 2017, Office Action.
U.S. Appl. No. 14/211,786, May 3, 2017, Office Action.
U.S. Appl. No. 14/628,113, May 19, 2016, Office Action.
U.S. Appl. No. 14/628,113, Sep. 23, 2016, Office Action.
U.S. Appl. No. 14/628,113, Apr. 13, 2017, Office Action.
Parr62, Ben; "Easter Egg: Yelp Is the iPhone's First Augmented Reality App,"; located at https://web.archive.org/web/20090829094113/http://mashable.com/2009/08/2007/yelp-aug . . . ; Aug. 27, 2009; 10 pages.
U.S. Appl. No. 14/628,113, Oct. 18, 2017, Office Action.
U.S. Appl. No. 15/463,926, Oct. 6, 2017, Office Action.
U.S. Appl. No. 14/628,113, May 31, 2018, Office Action.
U.S. Appl. No. 15/463,926, May 23, 2018, Notice of Allowance.

\* cited by examiner

SYSTEM AND METHOD FOR ACQUIRING VIRTUAL AND AUGMENTED REALITY SCENES BY A USER

CROSS-REFERENCE TO RELATED APPLICATIONS

This application is a continuation of U.S. application Ser. No. 14/668,915, filed Mar. 25, 2015, which is a continuation of U.S. application Ser. No. 13/302,977, filed Nov. 22, 2011, now issued as U.S. Pat. No. 9,017,163, which claims priority to U.S. Application No. 61/448,133, filed Mar. 1, 2011 and U.S. Application No. 61/417,199, filed Nov. 24, 2010, the disclosures of which are incorporated herein in their entirety by these references.

TECHNICAL FIELD

This invention relates generally to the virtual and augmented reality field, and more specifically to a new and useful system and method for acquiring virtual and augmented reality scenes by a user.

BACKGROUND AND SUMMARY

Many techniques for capturing spherical images require complicated equipment, including very expensive and specialized camera lenses or other fixtures that must be used. This in effect ensures that only highly specialized and/or trained professionals to generate such imagery. Collection of such data also typically requires specially equipped vehicles, which only increases the associated costs and specialization required for capturing spherical image data. In some cases, image capture involves driving along substantially every road of nearly every city to provide a satisfactorily large data set. Despite such investment in capturing this data, the resulting images are limited to images taken from roads. Furthermore, maintaining the image data requires constant collection, which again increases the costs associated with image acquisition. Despite these inherent limitations to the images available, numerous applications have been formed to utilize such spatially associated imagery. In particular, augmented reality applications on mobile devices have in recent years begun to find the images to be a great resource. Yet, the complicated and costly image collection process ultimately limits the potential uses of this data.

A solution to the foregoing restrictions is described in detail below. A method of acquiring virtual or augmented reality (VAR) scenes according to a preferred embodiment can include: at a plurality of locations of interest, providing one or more users with a predetermined pattern for image acquisition with an image capture device and for each of the one or more users, in response to a user input, acquiring at least one image at the location of interest. The method of the preferred embodiment can also include for each of the one or more users, in response to the acquisition of at least one image, providing the user with feedback to ensure a complete acquisition of the virtual or augmented reality scene; and receiving at a remote database, from each of the one or more users, one or more VAR scenes. One variation of the method of the preferred embodiment can include providing game mechanics to promote proper image acquisition and promote competition between users. Other features and advantages of the method of the preferred embodiment and its variations are described in detail below with reference to the following drawings.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
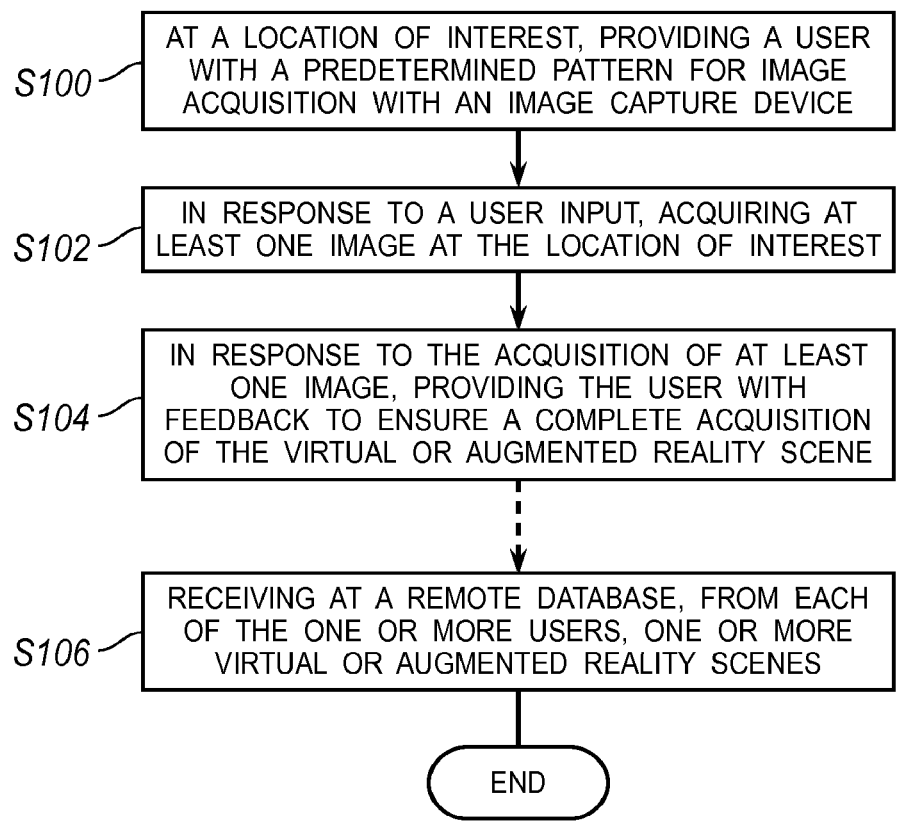
FIG. 1 is a flowchart depicting a method of acquiring virtual and augmented reality scenes by a user in accordance with a preferred embodiment and a variation thereof.

As shown in FIG. 1, a method of the preferred embodiment can include at a location of interest, providing a user with a predetermined pattern for image acquisition with an image capture device in block S100 and in response to a user input, acquiring at least one image at the location of interest in block S102. The method of the preferred embodiment can further include in response to the acquisition of at least one image, providing the user with feedback to ensure a complete acquisition of the virtual or augmented reality (VAR) scene. The method of the preferred embodiment functions to reduce provide for a uniform, simple, and comprehensive manner in which one or more users can collect image data about their respective surrounding environments. The method of the preferred embodiment further functions to create uniformly accessible VAR scenes, which can be retrieved from one or more users and provided to one or more viewers through network access to a remote database. The images acquired can be either two-dimensional or three-dimensional images, and they can be either still photographs or one or more frames of a video sequence.

Enabling capture of spatial imagery by common devices preferably further functions to enable widespread, crowd-generated, spatially assigned image data. Since untrained users are expected to capture the images, the method preferably further functions to unobtrusively guide the capture process so that novice photographers will be able to acquire usable quality VAR scenes. One preferred variation of the method described below utilizes game play mechanics to encourage proper capture of scene imagery. The game play mechanics preferably provide a task-based challenge for the user with device orientation as a central control mechanic. In the background of a game-like interaction, the game preferably results in the user properly orienting the phone for the capture of a scene. Other non-game like interactions can alternatively be used. Preferably, a user acquires images by directing the image capture device outward and systematically spins and directs the camera at particular orientations as described below. In the end, an image of a spherical space is preferably created to simulate the world viewable in any direction from the perspective of the user.

As shown in FIG. 1, the method of the preferred embodiment can include block S100, which recites at a location of interest, providing a user with a predetermined pattern for image acquisition with an image capture device. Block S100 preferably functions to present a user with one or more cues, instructions, formats, and/or templates to follow in acquiring one or more of a series of images usable in a VAR scene. Preferably, the predetermined pattern does not contain undesirable "holes" or voids in the image data. The preferred predetermined pattern can be used to form a spatial image scene that can be described as a surface in the shape of a sphere, plane, cylinder, planar path, curved plane, or any suitable surface. For example, if a full spherical image is the objective, the predetermined pattern preferably guides the user to move the image capture device in a way that collects image data from the whole world around the user. The poles of a sphere or other singularities can be special conditions that the predetermined pattern includes. As another example, if a user is capturing a plane of image data while walking, the predetermined pattern preferably ensures that a full plane worth of image data with no holes is captured. As used herein, the preferred predetermined pattern can include a programmatically determined pattern that is subject to user override (i.e., through the user actuating the user interface as desired). Alternatively, some or all aspects of the preferred predetermined pattern can be compulsory (i.e., through a feedback mechanism of the type described below) to ensure proper acquisition of the image/s.

In another variation of the method of the preferred embodiment, the predetermined pattern can include designated positions in which an individual image or frame must be captured. When the image capture device is in position the image is captured from that designated position/orientation. In another variation, the preferred predetermined pattern can contain rules for the physical and/or temporal spacing of images. For example, each individual image can require a change in position and/or orientation that differs by some defined amount from at least a second position and/or orientation. The second position and/or orientation preferably are the position and/or orientation of a second image. For example, if a first image is captured when the image capture device is directed in a North direction, the second image may not be captured until the image capture device is oriented in a direction that differs from the first image by a predetermined angular measure, i.e., thirty degrees. The predetermined pattern can be presented as straightforward instructions that are facilitated through visual, audio, or tactile feedback. In one example, the predetermined pattern can require the user to "paint the world," where the user must collect image data for every desired region to "paint" (or "wipe clean" to reveal a scene or image). In this variation, the user is not directed to move to any particular orientation but the predetermined pattern indicates what areas have been captured. By successfully "painting" the whole space, the user can complete the entire predetermined pattern. The guidance of the predetermined pattern can additionally be interactive and incorporate feedback and/or game mechanics as described in detail below.

Image acquisition preferably includes photographic and/or video acquisition using a digital image capture device. A suitable image capture device can include a camera, a video camera, a laptop computer, a tablet computer, a smart phone, or any other handheld or mobile device configured to acquire photos or videos. Preferably, the image capture device can include at least one feedback channel for presenting the predetermined pattern to the user, such as for example a display or audio output that provides the user with the predetermined pattern and/or ongoing feedback for image acquisition. Additionally, the image capture device preferably includes one or more embedded feedback controllers to internally control the image acquisition process in response to the orientation and/or location of the device.

Preferably, the image capture device of the method of the preferred embodiment can be configured to determine its own orientation in three-dimensional space. For example, the preferred image capture device can include one or more modules or sensors for detecting, determining, calculating, and/or providing a projection matrix, which is a mathematical representation of an arbitrary orientation of a three-dimensional object having three degrees of freedom relative to a second frame of reference. As an example, the projection matrix can include a mathematical representation of a device's orientation in terms of its Euler angles (pitch, roll, yaw) in any suitable coordinate system. Preferably, the image capture device can include one or more cameras (front/rear), an accelerometer, a gyroscope, a MEMS gyroscope, a magnetometer, a pedometer, a proximity sensor, an infrared sensor, an ultrasound sensor, a global position satellite transceiver, WiFi transceiver, mobile telephone components, and/or any suitable combination thereof for calculating the projection matrix and/or the associated Euler angles. Orientation and/or position information can be gathered in any suitable fashion, including device Application Programming Interfaces (API) or through any suitable API exposing device information, e.g., using HTML5 to expose device information including orientation/location.

As shown in FIG. 1, the method of the preferred embodiment can further include block S102, which recites in response to a user input, acquiring at least one image at the location of interest. Block S102 preferably functions to cause an image capture device to acquire, receive, select, and/or capture image data for processing into at least an image and/or at least a portion of a VAR scene. Preferably, if the image capture mechanism is still photography, then the acquisition of the at least one image is substantially simultaneous with a user input, such as a tactile input or audio command. Alternatively, if the image capture mechanism is video photography, then the acquisition of the at least one image can continue for a duration following the user input. In another alternative, the acquisition of the at least one image can be initiated in response to a predetermined orientation/location condition of the image capture device, such that if the user positions/moves the image capture device in a predetermined fashion, the image capture device will automatically acquire the image. In another alternative, the image capture mechanism can include both still photography and video photography portions, in which case the image acquisition process can respond as necessitated by the requirements of the image capture device. Another variation of the method of the preferred embodiment can include acquiring a second image that substantially replicates a prior acquired image. Preferably, the second image acquisition can be performed in response to determining a low quality in the prior acquired image. Image quality can preferably be determined at the image capture device, or alternatively at a remote database or server during a subsequent image processing phase.

In another variation of the method of the preferred embodiment, acquiring at least one image can include acquiring at least one image in a floating point format to ensure full dynamic spectrum of the virtual or augmented reality scene. As noted below, the VAR scene can be any suitable geometry, including for example a spherical image disposed substantially symmetrically about a nodal point. Acquisition of the VAR image data in a floating-point exposure preferably functions to allow the user to view/experience the full dynamic range of the image without having to artificially adjust the dynamic range of the images/scene. Preferably, the method of the preferred embodiment globally adjusts the dynamic range of each image as it is acquired such that a portion of the image in the center of the display is within the dynamic range of the device. By way of comparison, high dynamic range (HDR) images appear unnatural because they attempt to confine a large image range into a smaller display range through tone mapping, which is not how the image is naturally captured by a digital camera. Preferably, the method of the preferred embodiment preserves the natural range of the image by adjusting the range of the image to always fit around (either symmetrically or asymmetrically) the portion of the image viewable in an approximate center a display on which it is to be viewed. As noted elsewhere herein, the acquired image can include for example a video, a series of still photographs, or any suitable combination thereof. Accordingly, the method of the preferred embodiment can further include adjusting the floating point exposure of the acquired images in response to any changes in the sequence of images that make up the VAR scene, such as for example adjustments in the lighting as a user progresses through a series of still images.

As shown in FIG. 1, the method of the preferred embodiment can further include block S104, which recites in response to the acquisition of at least one image, providing the user with feedback to ensure a complete acquisition of the VAR scene. Block S104 preferably functions to guide, teach, instruct, and/or cause a user to acquire any subsequent images in accordance with the predetermined pattern so as to ensure completion of the complete VAR scene. Block S104 preferably further functions to guide, instruct, direct, and/or control the image capture device to capture images in a predetermined fashion to ensure a complete acquisition of the VAR scene. Preferably, the feedback can include at least one of user-oriented feedback or device-oriented feedback. User-oriented feedback can include for example visual, tactile, or audio feedback to communicate corrective suggestions to the user during the image acquisition sequence. As an example, user-oriented feedback can include distorting a display and/or audio feed during motion of the device such that a user is prompted to wait until there is a clear image, written instruction, sound, and/or the like prior to capturing the intended image/frame. Preferably, acceleration of the device can be determined by any suitable sensor, such as the one or more cameras (front/rear), an accelerometer, a gyroscope, a MEMS gyroscope, a magnetometer, a pedometer, a proximity sensor, an infrared sensor, an ultrasound sensor. In response to a device acceleration/motion, the device can preferably provide user-oriented feedback to the user in order to get the user to manage the device motion and improve the capture of the VAR scene.

Preferably, device-oriented feedback can include for example automated control of the timing, sequencing, and selection of captured still images/video frames based on one or more predetermined factors. Preferably, both user-oriented and device-oriented feedback is provided to the user. Alternatively, the device-oriented feedback can be directed to the image capture device with or without the user's knowledge. Preferably, the user-oriented feedback can be combined with one or more aspects of the predetermined pattern noted above in block S100 of the method of the preferred embodiment to provide the user with a continuous input-feedback loop relating to the acquisition of the VAR scene such that the user does not stray or (per the device's action) is unable to stray from the predetermined pattern.

As noted above, the image capture device can preferably include one or more cameras (front/rear), an accelerometer, a gyroscope, a MEMS gyroscope, a magnetometer, a pedometer, a proximity sensor, an infrared sensor, an ultrasound sensor—all or any of which can be used to determine an acceleration/motion of the image capture device through the predetermined pattern. Device-oriented feedback can preferably be initiated in response to a sensor determination and/or a context of the predetermined pattern (i.e., whether a sudden acceleration of the device proper at a particular point in the acquisition process.) Preferably, the method of the preferred embodiment provides device-oriented feedback in response to an improper/non-ideal handling of the image capture device for a predetermined portion (context) of the predetermined pattern. Device-oriented feedback can automate the selection of video frames and/or the actuation of capturing still images, preferably in response to one or more predetermined conditions relating to the motion of the image capture device and/or the context of the predetermined pattern.

As an example, device-oriented feedback can control the selection of video frames and/or the actuation of capturing still images in response to one or more of: an angular/linear distance between the present location of the image capture device and the last captured/selected image/frame; an angular/linear distance between the present location of the image capture device and any other arbitrary previously captured/selected image/frame in the predetermined pattern; a time since the last captured/selected image/frame; an exposure difference measured from the last captured/selected image/frame; a current exposure level; an angular velocity of the image capture device; a shutter speed of the one or more cameras of the image capture device; a camera gain; a distance to any discrete guide point and/or guide region in the predetermined pattern and/or location of interest; a product of the angular velocity of the image capture device (average/current) and the shutter speed of the one or more cameras of the image capture device; and/or any explicit instruction from the user indicating a relative importance of the frame/image currently capturable by the image capture device. Alternatively, the device-oriented feedback can include any other usable measurements of the image capture device orientation and/or location, or any other suitable parameter relating to qualitative and/or quantitative aspects of the image sought.

In another variation of the method of the preferred embodiment, the predetermined pattern can include at least one of a spatial pattern or a temporal pattern. Preferably, a spatial pattern and/or a temporal pattern can function to provide a user with a readily accessible and easily understood representation of the predetermined pattern for image acquisition. Example temporal patterns can include audible/visible cues (including musical cues) that follow a predetermined pattern indicating when and/or in what direction the user should acquire the next image/frame. In another variation of the method of the preferred embodiment, the temporal pattern can include discrete intervals at which the user is signaled and/or instructed to capture the next image/frame in the VAR scene. Alternatively, the temporal pattern can include discrete intervals at which images/frames are automatically selected by the image capture device with or without notification to the user. As an example, if the image capture device includes a video camera, then the temporal pattern can include one or more discrete intervals that pace the acquisition of the series of frames in response to a predetermined timing, image capture device motion measurements, and/or image capture device input.

Figure 2:
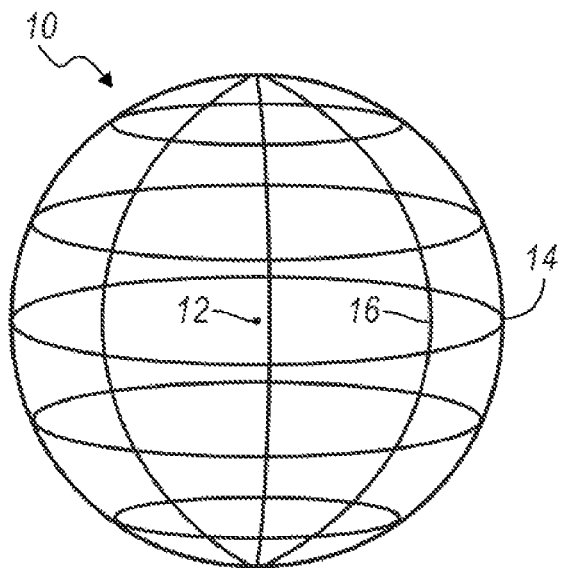
FIG. 2 is a schematic diagram of a spherical image acquirable by a user in accordance with the method of the preferred embodiment.

Suitable spatial patterns can generally include multi-sided enclosed geometries and linear open geometries. As an example, the predetermined pattern can include a path, trail, map or other one-dimensional route through which the user is instructed to acquire substantially planar images. As shown in FIG. 2, another example spatial pattern can include a substantially spherical or spheroidal composite of images surrounding a nodal point 12. The spherical predetermined pattern 10 preferably functions to permit a user and/or the image capture device to image an entire complete view of the space surrounding the nodal point 12. Preferably, the nodal point 12 is substantially coincident with a user, a user's head, or a portion of the user's head (i.e., a point between the user's eyes). Alternatively, the nodal point 12 can be substantially coincident with the image capture device. As shown, the spherical image 10 can define a series of latitudes 14 and a series of longitudes 16. In one variation of the method of the preferred embodiment, the predetermined pattern can include identifying points on the spherical image 10 by latitude 14/longitude 16 coordinates at which an image should be acquired by the user. Alternatively, the predetermined pattern of the preferred embodiment can include instructions to the user to scan a particular range of latitudes 14/longitudes 16 through each of a series of longitudes 16/latitudes 14. Preferably, if the predetermined pattern includes one or more images of a spherical image 10, then each of the individual images/frames can be acquired and/or processed as spherical images by the image capture device. Similarly, if the predetermined pattern includes a one-dimensional path, then each of the individual images/frames can be acquired and/or processed as planar images by the image capture device.

Figure 3:
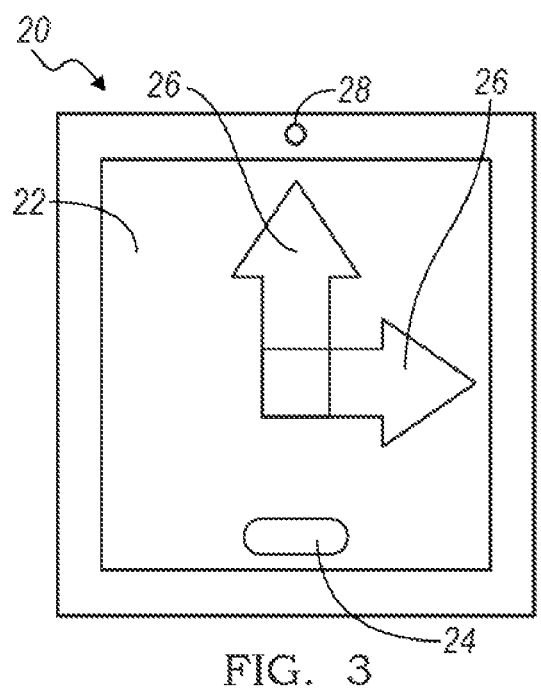
FIG. 3 is a schematic diagram of an apparatus and/or user interface configured for acquiring virtual and augmented reality scenes by a user in accordance with the method of the preferred embodiment.

As shown in FIG. 3, a predetermined pattern and/or user feedback in accordance with the preferred embodiment can be presented to the user of the device 20 through one or more visual cues. The device 20 of the preferred embodiment can include a display 22, such as for example a touch screen display providing a user interface having one or more actuators 24, and a front-facing camera 28. In the example embodiment described above, if the user is instructed to acquire images/frames composing a spherical image 10, then the device 20 can present a pattern/feedback through visual cues, such as arrows 26 that direct the user to move his or her device 22 in a predetermined direction. Preferably, the device 20 can use the front facing camera 28 to determine a position of the user and/or the nodal point 12, as well as to determine a proper focal/imaging distance between the user and the device 20. As noted above, acquisition of a spherical image 10 can include a rotation of the device 20 through a range of latitudes 14 (along longitudinal arrow 26) followed by a change in longitudes 16 (i.e., pivot the device in the direction of latitudinal arrow 26).

Figure 4:
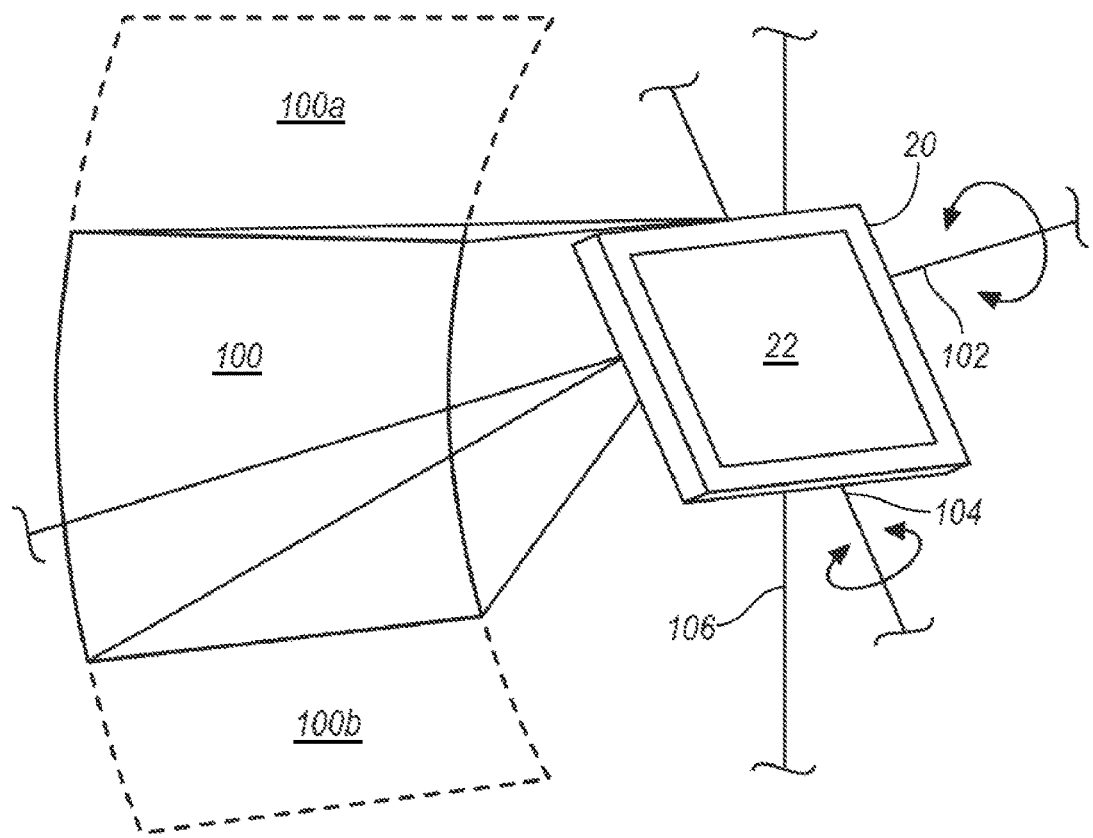
FIG. 4 is a schematic diagram of an apparatus and/or user interface configured for acquiring virtual and augmented reality scenes by a user in accordance with the method of the preferred embodiment.

As shown in FIG. 4, the predetermined pattern of the method of the preferred embodiment can include instructions for rotating the device 20 about one or more discrete axes 102, 104, 106. Preferably, the instructions can be presented to the user through the display 22 of the device 20, although other suitable tactile and/or audio instructions can be communicated in addition to or in lieu of visible instructions. As shown in FIG. 4, the device 20 can preferably be rotated through a series of pitch values about axis 102 in order to capture a series of discrete images/frames 100, 100A, 100B. Preferably, the device 20 can additionally and/or subsequently be rotated through a series of roll values along axis 106 for each series of images/frames captured 100, 100A, 100B. Acquisition of a sufficient range of pitch values and roll values preferably results in the collection of an entire spherical image 10 of the type described above. Alternatively, if the device 20 is equipped with front-facing and rear-facing cameras, then the sufficient range of pitch values and roll values can be divided in half, as the device 20 will be capturing opposing segments of hemispherical images at each acquisition. In another variation of the method of the preferred embodiment, the front-facing and rear-facing cameras can be configured with customized settings (i.e., exposure settings) such that each camera functions to supplement the other resulting in a fuller capture of all of the image data. Preferably, a user maintains the device 20 substantially still along axis 106 and rotates the device 20 about axis 106 during the image acquisition to ensure consistent and symmetrical image acquisition. Accordingly, the device 20 can preferably include one or more positioning functions, such as global position satellite capabilities, WiFi triangulation capabilities, and/or mobile telephone triangulation capabilities, in order to assist the user in maintaining the device 20 substantially along axis 106 during the acquisition process.

Figure 6:
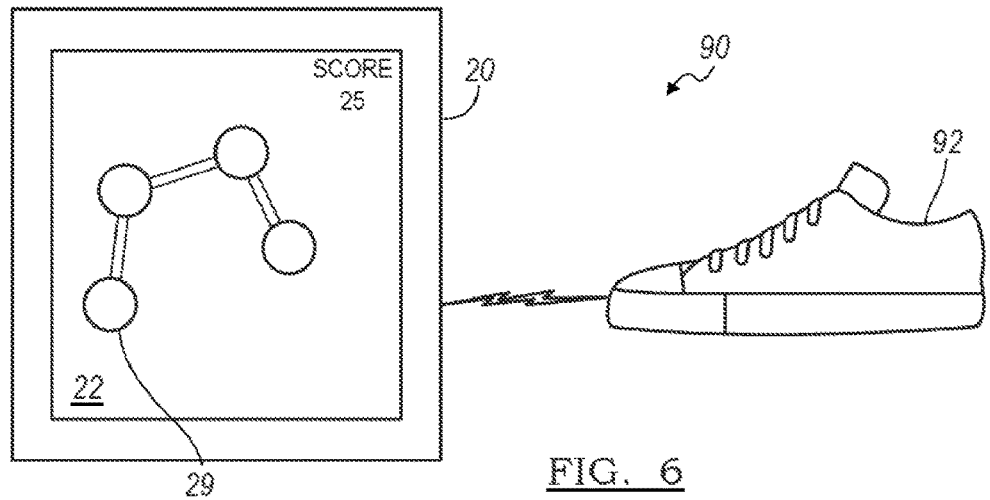
FIG. 6 is a schematic diagram of a variation of the apparatus and/or user interface configured for acquiring virtual and augmented reality scenes by a user in accordance with the method of the preferred embodiment.

As shown in FIG. 6, another variation of the method of the preferred embodiment can include providing a map to guide the user along a predetermined route as at least part of the user-oriented feedback. The map preferably functions to provide real-time or near-real time feedback and/or predetermined pattern information to the user through the display 22 of the device 20. The route 29 can include one or more predetermined locations at which the user is requested to acquire one or more images/frames for a VAR scene. In another variation of the method of the preferred embodiment, a game system 90 can include pairing the device 20 with a pedometer 92 to measure and/or direct a user's movement and/or progress along the route 29. As noted above, the device 20 can preferably include one or more positioning functions, such as global position satellite capabilities, WiFi triangulation capabilities, and/or mobile telephone triangulation capabilities, in order to assist the user in traversing the route 29.

Figure 7:
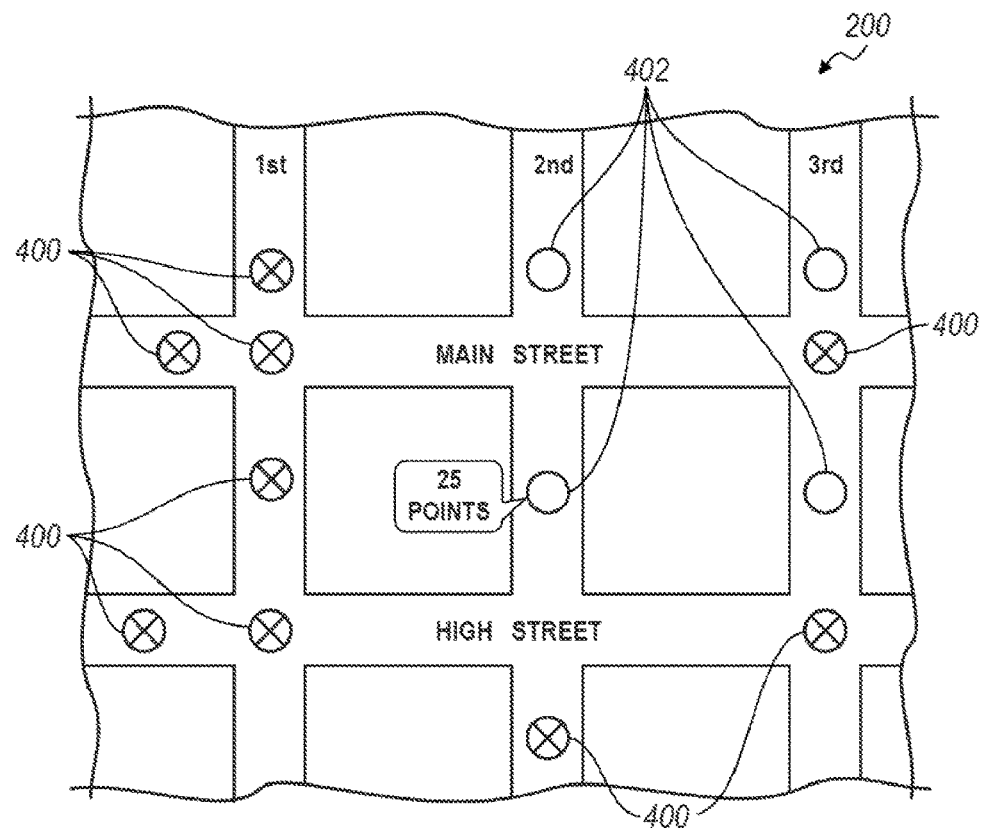
FIG. 7 is a schematic diagram of user feedback displayable on a user interface in accordance with the method of the preferred embodiment.

As shown in FIG. 7, another variation of the method of the preferred embodiment can include providing a game to the user as part of the user-oriented feedback. Preferably, the objective of the game can be to acquire virtual or augmented reality scenes. Providing a game to the user preferably functions to motivate one or more users to acquire VAR scenes while simultaneously ensuring that the acquired scenes are valuable and viewable to one or more viewers. As shown in FIG. 7, one example game can include a map interface 200 showing a series of captured VAR scenes 400 spread out with a series of open VAR scenes 402. Preferably, a point system or other suitable metric can be used to measure the value of each VAR scene 402, and a user with a predetermined number of points and/or ranking amongst other users can be in line for other compensation or prizes. Preferably, the competitive nature of the game mechanics will cause a group of users can acquire a large set of VAR scenes in a systematic and efficient manner, thereby providing VAR mapping of entire geographical locations including neighborhoods or cities.

Figure 5:
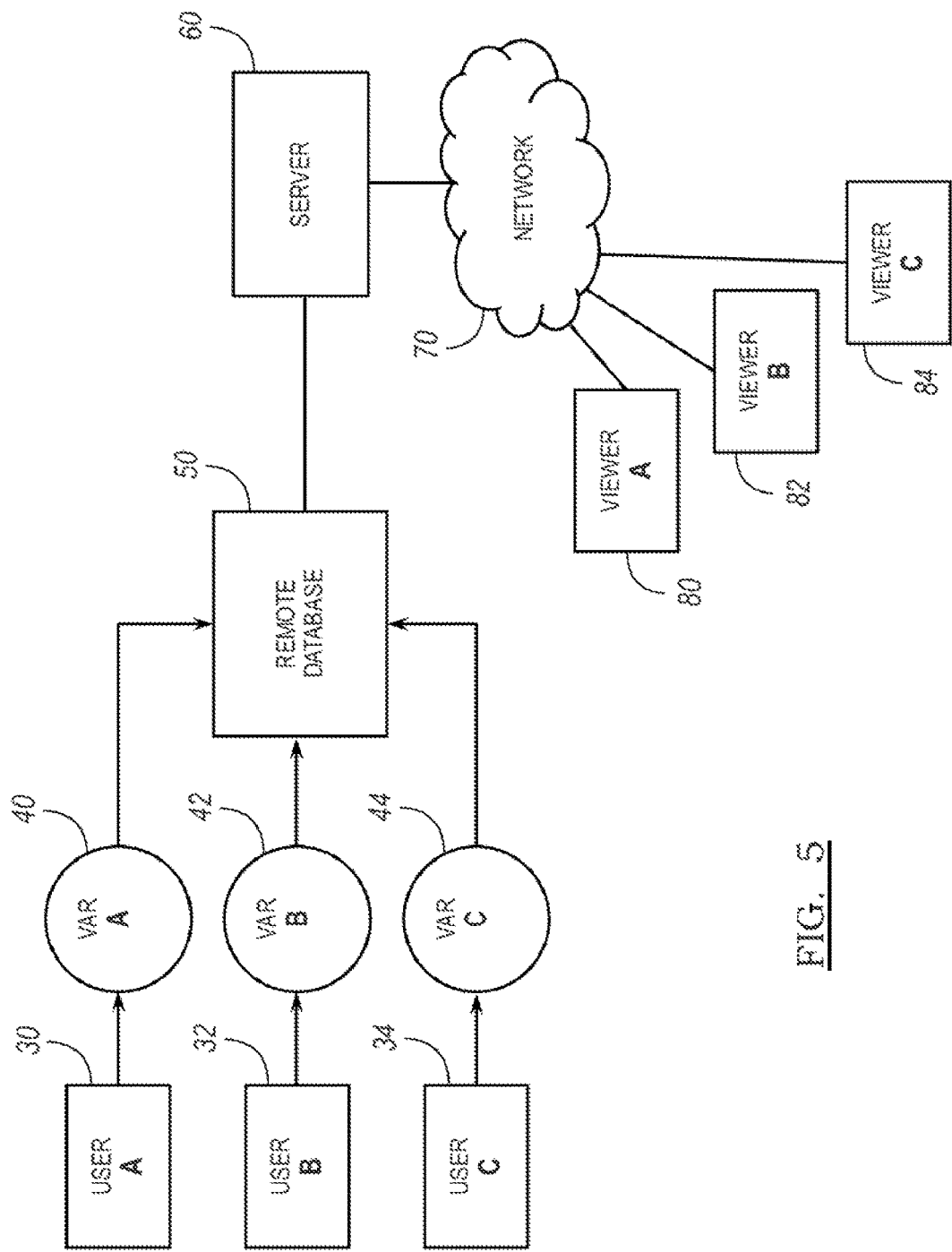
FIG. 5 is a schematic diagram of a system for receiving and/or storing one or more virtual and augmented reality scenes acquired by one or more users in accordance with the method of the preferred embodiment.

As shown in FIG. 1, another variation of the method of the preferred embodiment can include block S106, which recites receiving at a remote database, from each of one or more users, one or more VAR scenes. Block S106 preferably functions to aggregate, correlate, manage, store, and/or distribute one or more VAR scenes to a series of viewers. Preferably, each of the one or more VAR scenes is acquired following the method of the preferred embodiment and variations thereof. Alternatively, one of the one or more VAR scenes can be acquired and/or created by other means or methods and include non-image and non-video media. As shown in FIG. 5, block S106 can further function to allow one or more users 30, 32, 34 to transmit and/or upload their respective VAR scenes 40, 42, 44 to a remote database 50. The remote database 50 can be configured to include and/or be connected to a server 60 that is connectable to one or more viewers 80, 82, 84 through a network 70. Preferably, the server 60 can host one or more directories, files, and/or web pages containing and/or displaying the one or more VAR scenes 40 42, 44. In such a manner, the method of the preferred embodiment preferably functions to motivate and instruct a series of untrained users to acquire VAR scenes of their respective environments and distribute those VAR scenes to any number of interested viewers 80, 82, 84.

In another variation of the method of the preferred embodiment, the method can include compositing the at least one image and at least a second image into the VAR scene. Compositing the at least two images preferably organizes and optionally optimizes the data for constructing a construct or data file for a spatial image scene. Preferably, the spatial scene can be designed for rendering with a 3D or 2D graphics platform such as OpenGL, WebGL, or Direct3D. The rendering can alternatively occur within a browser using HTML5 and/or CSS3 properties to apply appropriate transformations. In the HTML variation, HTML and CSS transforms can be used to render the VAR scene. As noted above, a VAR scene is preferably one that is optimally viewed with orientation/positioning parameters. For example, a viewer can preferably explore a spherical spatial image scene on a mobile device by rotating and directing the mobile device in different directions. The displayed image on the mobile device preferably corresponds to the view a viewer would have seen during the capture of consecutive images. Additionally, pedometer sensing and/or GPS sensing can be used to navigate a spatial image that incorporates the user position such as walking along a path. In the HTML rendering variation, the device orientation/location/displacement is fetched (e.g., through HTML5 or a device API) and used to periodically update (e.g., 60 frames per second) the CSS transform properties of media of the virtual and augmented reality view. Exploring a spatial image scene can alternatively be achieved on a desktop or fixed device.

In variations of the method of the preferred embodiment, compositing the two or more images can occur on the image capture device 20 or at the remote database 50. Preferably, the two or more images can be stitched together using the ordering of the consecutive images and image processing to align the two or more images. Additionally, orientation and/or location information that was collected at the image capture device while collecting the consecutive images is preferably used to spatially organize the images. Additionally, orientation and/or location information and image processing techniques can be cooperatively used to combine the consecutive images and assign the correct orientation to each of the at least two images. For example, the at least two images can be stitched substantially from image processing techniques, but then assigned a global position based on a GPS signal and an orientation based on the orientation data (i.e., MEMS gyroscope, accelerometer, and the like) provided by the image capture device. In another variation of the method of the preferred embodiment, audio and/or video data collected can additionally be mapped to particular areas of the spatial image scene. During viewing of the scene, the audio or video can be presented chronologically to show where the user was pointing while recording the media, or alternatively, presented when viewing a particular area.

Additionally, the method of a preferred embodiment can include directing a user to maintain a substantially constant viewing distance between the user and the image capture device, which preferably functions to regulate the manipulation of the image capture device during movement through the predetermined pattern. The viewing distance is preferably defined as the distance between the image capture device and the nodal point (e.g., the eyes of the user). The viewing distance can additionally be defined as the focal length. A substantially constant viewing distance preferably creates a steady field of view during the traversal of the predetermined pattern and aids in the capture of a uniform scene of spatial imagery. An ideal viewing distance can additionally be standardized to be within a particular range such as between one and two feet between the image capture device and the nodal point.

Preferably, a front facing camera can be used to detect the distance between the image capture device and the nodal point. As noted above, the nodal point can include a head, face, or other element of a user. The image capture device and the front facing camera preferably determine the viewing distance using the size of the element as an indicator. Preferably, the image capture device can track relative changes in size of the element, or an approximation can be used based on the average size of users' head, the spacing of the user's eyes, or any other suitable measurement or approximation. Preferably, the user-oriented feedback and/or device-oriented feedback can include real time or near real time tracking of the substantially constant viewing distance. For example, the image capture device can display text or other graphics that are best and/or only viewable at the substantially constant viewing distance. Alternatively or additionally, device-oriented feedback can include adjusting camera parameters of the image capture device in response to a non-compliant substantially constant viewing distance. The device-oriented feedback can preferably includes adjusting viewing distance or field of view settings, including for example one or more physical settings of the camera (e.g., lens adjustments) or image processing techniques (e.g., adjusting cropping of an image) based on the measured or approximated viewing distance.

In another variation, the method of a preferred embodiment can include constructing a scene of spatial imagery with parallax properties, which preferably functions to form three-dimensional images from images collected from differing viewpoints. During the image capture procedure described above, useable parallax properties are preferably collected due to the viewing distance between the nodal object and the device (as opposed to a camera being rotated about an axis centered on the camera). The parallax properties can be inherent in the raw captured image data or can be formalized in approximations of 3D model. The centers of individual images/frames are preferably weighted as having perpendicular viewing angles (i.e., plan view) and therefore not being influenced by parallax. By way of comparison, the sides of images/frames preferably capture the parallax properties of how an object in the image/frame apparently shifts when viewed from different lines of sight. Parallax properties can preferably be used to construct stereoscopic imagery from two different images/frames with corresponding parallax properties (i.e., viewed from opposing angles approximating the viewing angles of the human eyes).

Preferably, parallax properties can be constructed for individual objects during the capture process by obtaining more imagery of that object from a plurality of perspectives. For example, to capture a focus object, the method of the preferred embodiment can direct a user to move the camera in a circular pattern around the object (or otherwise capture different vantage points of the object) with the camera directed substantially at the object. Accordingly, when viewing the generated VAR scene, a viewer can preferably view the focus object from a variety of perspectives because of the enhanced capture process for the focus object. Additionally, by capturing parallax properties, the distance of objects can be analyzed based on parallax shifts (near field objects being more susceptible and far field objects less so). For example, edge detection image processing can be used to isolate areas impacted by parallax in different ways. Additionally, parameterized parallax properties can be utilized in the display of the VAR scene, and images from the collected consecutive images that have a spatial separation substantially equal to the distance between human eyes can be used to create stereoscopic images for use in a VAR scene.

The image capture device and methods of the preferred embodiment can be embodied and/or implemented at least in part as a machine configured to receive a computer-readable medium storing computer-readable instructions. The instructions are preferably executed by computer-executable components preferably integrated with the device 20, the display 22, the remote database 50 and/or the server 60. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but any suitable dedicated hardware device can (alternatively or additionally) execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
   receiving, from a first client device:
   a plurality of images of a location, and
   device orientation information for the plurality of images;
   compositing, using the device orientation information, the plurality of images into a spherical spatial image scene by spatially organizing the plurality of images into the spherical spatial image scene based on the device orientation information; and
   providing the spherical spatial image scene to a second client device, wherein the spherical spatial image scene is explorable by rotating or changing a direction of the second client device.

2. The method of claim 1, wherein compositing the plurality of images into the spherical spatial image scene comprises compositing the plurality of images surrounding a nodal point.

3. The method of claim 2, wherein:
   the nodal point represents a position of a user of the first client device while the first client device captures the plurality of images; and
   the device orientation information comprises a detected distance between the first client device and the user of the first client device while the first client device captures the plurality of images.

4. The method of claim 2, wherein compositing the plurality of images surrounding the nodal point comprises compositing the plurality of images that include a complete view of space surrounding the nodal point.

5. The method of claim 2, wherein the nodal point represents a position of the first client device while the first client device captures the plurality of images.

6. The method of claim 1, wherein the device orientation information for the plurality of images comprises gyroscope data from a gyroscope sensor of the first client device.

7. The method of claim 1, further comprising:
   determining parallax properties associated with each of the plurality of images; and
   weighting different portions of each of the plurality of images based on the parallax properties to represent different viewing angles for objects within the plurality of images.

8. A non-transitory computer readable medium storing instruction thereon that, when executed by at least one processor, cause a system to:
   receive, from a first client device:
   a plurality of images of a location, and
   device orientation information for the plurality of images;
   composite, using the device orientation information, the plurality of images into a spherical spatial image scene by spatially organizing the plurality of images into the spherical spatial image scene based on the device orientation information; and
   provide the spherical spatial image scene to a second client device, wherein the spherical spatial image scene is explorable by rotating or changing a direction of the second client device.

9. The non-transitory computer readable medium of claim 8, wherein a viewable portion of the spherical spatial image scene changes according to a rotation of the second client device.

10. The non-transitory computer readable medium of claim 8, further comprising instructions that, when executed by the at least one processor, cause the system to composite the plurality of images into the spherical spatial image scene in part by compositing the plurality of images surrounding a nodal point.

11. The non-transitory computer readable medium of claim 10, wherein the nodal point represents a position of the first client device while the first client device captures the plurality of images.

12. The non-transitory computer readable medium of claim 10, further comprising instructions that, when executed by the at least one processor, cause the system to composite the plurality of images surrounding the nodal point in part by compositing the plurality of images that include a complete view of space surrounding the nodal point.

13. The non-transitory computer readable medium of claim 8, further comprising instructions that, when executed by the at least one processor, cause the system to composite the plurality of images into the spherical spatial image scene in part by stitching the plurality of images together using an ordering of the plurality of images as consecutively captured by the first client device.

14. The non-transitory computer readable medium of claim 8, wherein the device orientation information for the plurality of images comprises gyroscope data from a gyroscope sensor of the first client device.

15. A system comprising:
at least one processor; and
at least one non-transitory computer readable storage medium storing instructions thereon that, when executed by the at least one processor, cause the system to:
receive, from a first client device:
a plurality of images of a location, and
device orientation information for the plurality of images;
composite, using the device orientation information, the plurality of images into a spherical spatial image scene by spatially organizing the plurality of images into the spherical spatial image scene based on the device orientation information; and
provide the spherical spatial image scene to a second client device, wherein the spherical spatial image scene is explorable by rotating or changing a direction of the second client device.

16. The system of claim 15, further comprising instructions that, when executed by the at least one processor, cause the system to composite the plurality of images into the spherical spatial image scene in part by compositing the plurality of images surrounding a nodal point.

17. The system of claim 16, wherein:
the nodal point represents a position of a user of the first client device while the first client device captures the plurality of images; and
the device orientation information comprises a detected distance between the first client device and the user of the first client device while the first client device captures the plurality of images.

18. The system of claim 16, further comprising instructions that, when executed by the at least one processor, cause the system to composite the plurality of images surrounding the nodal point in part by compositing the plurality of images that include a complete view of space surrounding the nodal point.

19. The system of claim 15, further comprising instructions that, when executed by the at least one processor, cause the system to composite the plurality of images into the spherical spatial image scene in part by stitching the plurality of images together using an ordering of the plurality of images as consecutively captured by the first client device.

20. The system of claim 15, further comprising instructions that, when executed by the at least one processor, cause the system to:
determine parallax properties associated with each of the plurality of images; and
weight different portions of each of the plurality of images based on the parallax properties to represent different viewing angles for objects within the plurality of images.

* * * * *